(12) United States Patent
Ishii

(10) Patent No.: US 7,992,660 B2
(45) Date of Patent: Aug. 9, 2011

(54) CRAWLER VEHICLE

(75) Inventor: Toyokichi Ishii, Akashi (JP)

(73) Assignee: Kobelco Cranes Co., Ltd., Tokyo (JP)

( * ) Notice: Subject to any disclaimer, the term of this patent is extended or adjusted under 35 U.S.C. 154(b) by 664 days.

(21) Appl. No.: 12/021,359

(22) Filed: Jan. 29, 2008

(65) Prior Publication Data

US 2008/0217992 A1    Sep. 11, 2008

(30) Foreign Application Priority Data

Mar. 8, 2007  (JP) ................................ 2007-059257

(51) Int. Cl.
  *B62D 55/084*  (2006.01)
(52) U.S. Cl. ..................................... 180/9.48
(58) Field of Classification Search ................ 180/9.48; 280/638; 56/211, 228, 385; 172/456, 581, 172/582
  See application file for complete search history.

(56) References Cited

U.S. PATENT DOCUMENTS

| | | | |
|---|---|---|---|
| 2,681,231 A | | 6/1954 | Kondracki |
| 4,341,276 A | * | 7/1982 | Furuichi ...................... 180/9.48 |
| 5,018,591 A | * | 5/1991 | Price ............................... 180/9.5 |
| 5,072,800 A | * | 12/1991 | Price ............................. 180/9.48 |
| 6,851,494 B2 | * | 2/2005 | Harthauser .................. 180/9.48 |
| 2001/0025732 A1 | | 10/2001 | Lykken et al. |
| 2004/0239092 A1 | | 12/2004 | Haringer |

FOREIGN PATENT DOCUMENTS

| | | | |
|---|---|---|---|
| DE | 1 172 549 | | 6/1964 |
| EP | 1 106 488 A2 | | 6/2001 |
| GB | 636228 | | 4/1950 |
| JP | 60-94877 | | 5/1985 |
| JP | 2-63284 | | 5/1990 |
| JP | 4-26189 | | 3/1992 |
| JP | 7-15828 | | 4/1995 |
| JP | 7-96869 | | 4/1995 |
| JP | 7-165136 | | 6/1995 |
| JP | 7-292721 | | 11/1995 |
| JP | 08142935 A | * | 6/1996 |
| JP | 9-193848 | | 7/1997 |
| JP | 11-91646 | | 4/1999 |
| JP | 2006-290020 | | 10/2006 |
| KR | 10-2005-0063419 | | 6/2005 |
| KR | 2005063419 A | * | 6/2005 |
| WO | WO 97/31813 | | 9/1997 |
| WO | WO 99/01331 | | 1/1999 |

OTHER PUBLICATIONS

EP—Patent Application No. 08151105.7, Jun. 16, 2009 (Claims 1-3). This application Corresponds with KR 10-2005-0063419.

* cited by examiner

*Primary Examiner* — Tony H. Winner
*Assistant Examiner* — Wesley Potter
(74) *Attorney, Agent, or Firm* — Oblon, Spivak, McClelland, Maier & Neustadt, L.L.P.

(57) ABSTRACT

In a crawler vehicle, at the time of crane operation at a place where a grounding space of crawlers is limited, a land leveling preparation is suppressed as little as possible so as to improve efficiency of the operation. The crawler vehicle is provided with left and right crawler frames on the both left and right sides of a track frame. The crawler frames can be moved between an expansion position for maximizing a distance between centers of the crawlers and a contraction position for minimizing the distance. Further, the crawler vehicle can position the crawler frames to the track frame at an intermediate position in the middle of the expansion position and the contraction position.

5 Claims, 6 Drawing Sheets

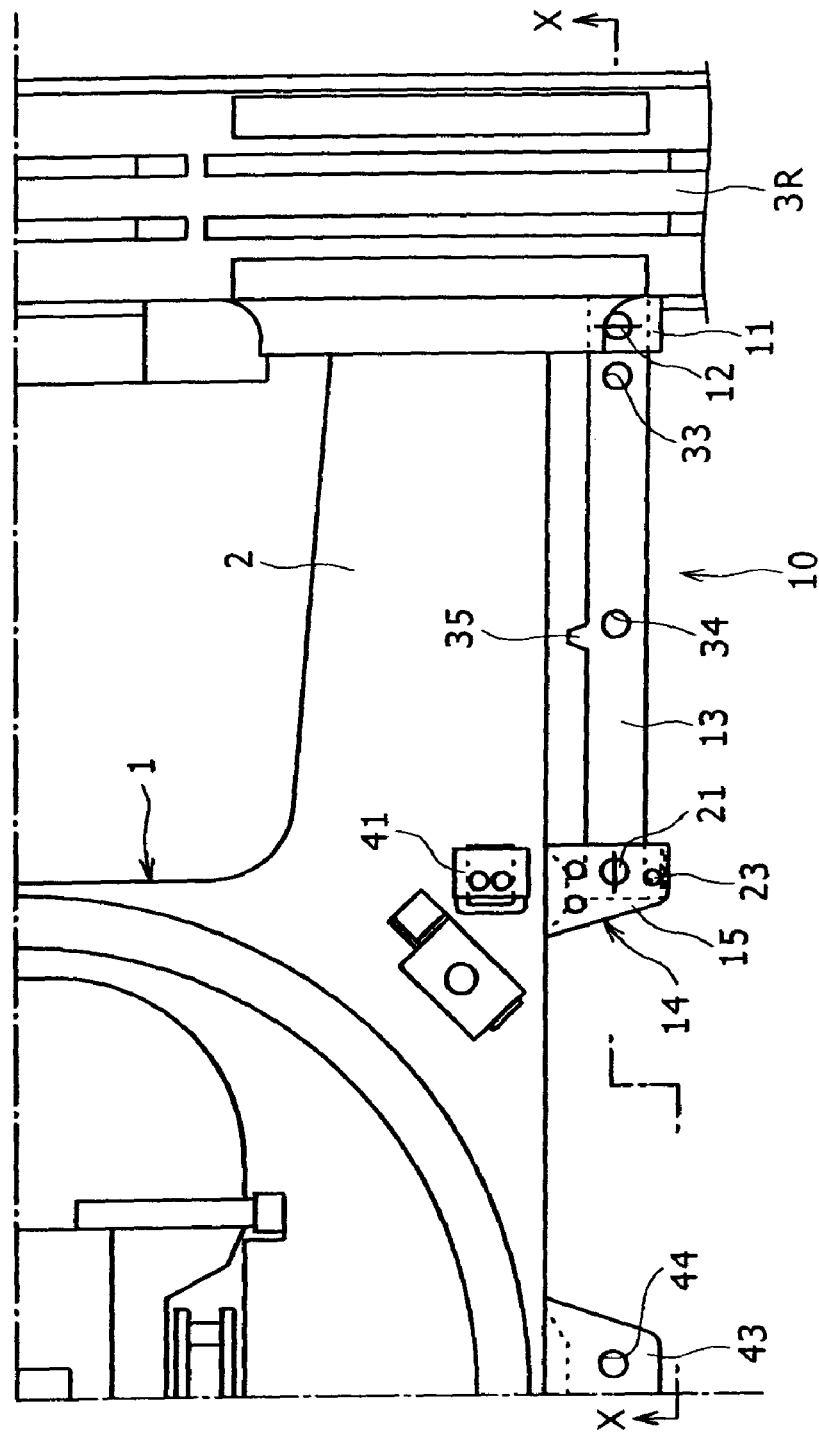

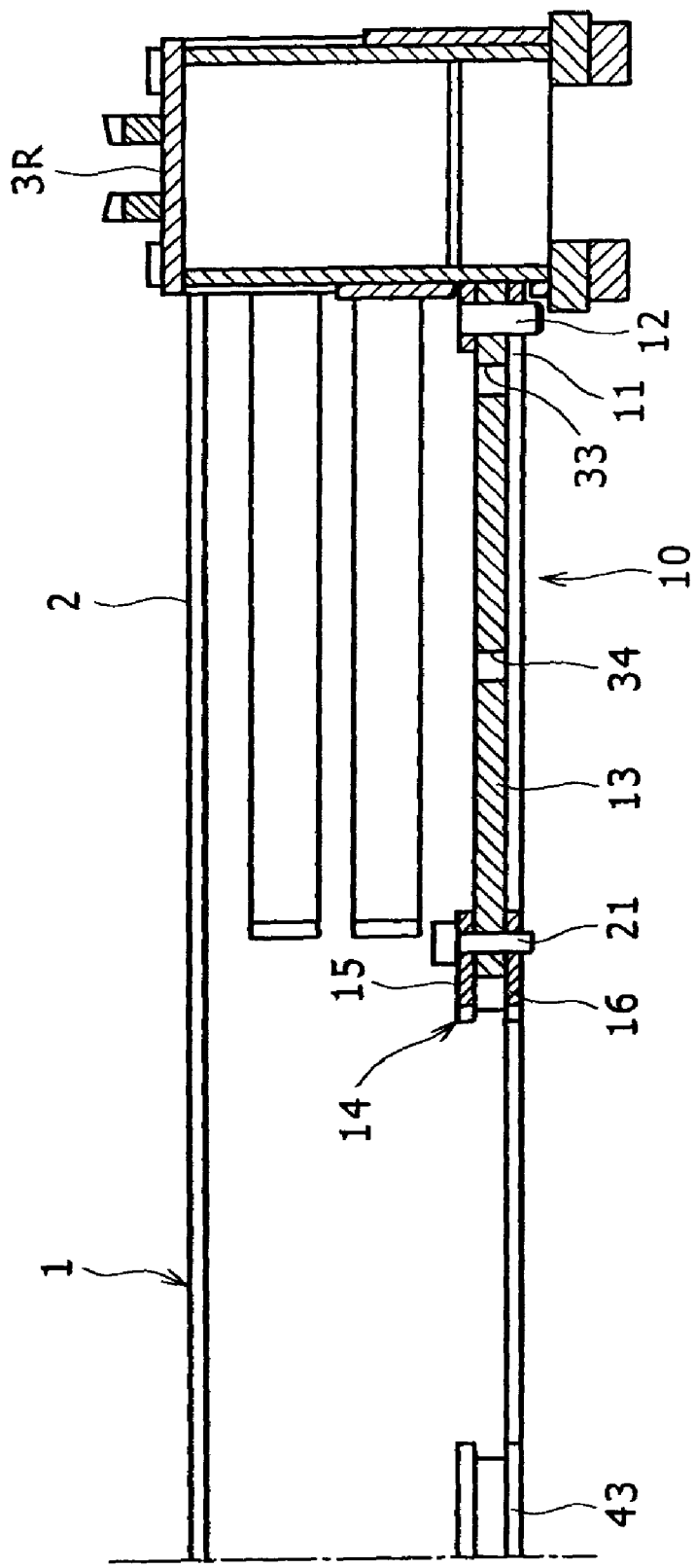

CRAWLER VEHICLE

BACKGROUND OF THE INVENTION

1. Field of the Invention

The present invention relates to a crawler vehicle such as a crawler crane and a hydraulic excavator. Particularly, the present invention relates to a device for positioning crawler frames movably provided on the both left and right sides of a track frame.

2. Description of Related Art

A description will be given to a structure of the crawler vehicle such as the crawler crane below. A lower travelling body onto which an upper rotating body is mounted includes a track frame and a pair of left and right crawler frames. In outer peripheries of the crawler frames, crawlers are installed. In such a crawler frame structure, a distance between centers of the crawlers is expanded in order to improve stability while the crane is working. The distance between centers of the crawlers is contracted while the crane is carried by a trailer. The above is influenced by legislation.

As the related art of such a crawler vehicle, a description will be given to a crawler vehicle disclosed in Japanese Utility Model Publication No. Hei7-15828. In the crawler vehicle, crawler frames are provided with through holes passing through in the width direction. To the through holes, axles of a track frame are slidably fitted. Between the track frame and the crawler frames, hydraulic cylinders are provided. The hydraulic cylinders move the crawler frames in the width direction along the axles of the track frame.

Japanese Utility Model Publication No. Hei7-15828 also discloses a positioning device for, when the crawler frames are moved to an expansion position or a contraction position along the axles of the track frame, positioning and fixing the crawler frames at the above positions. The positioning device is provided with a connection link arranged in the width direction along a side surface of the axle of the track frame, a bracket for fixing one end of the connection link to the crawler frames, and a link connection member fixedly attached to the side surface of the axle of the track frame for supporting the other end side of the connection link. By connecting the connection link to the link connection member with a connection pin at the expansion position and the contraction position, the positioning device fixes the crawler frames to the track frame at both the positions.

In the conventional crawler vehicle, from a view of ensuring the stability at the time of crane operation and the width at the time of conveyance, distance between centers of crawlers is only switched to maximum and minimum. Therefore, at a working place such as a mountain area where a grounding space of the crawlers is limited, there is a need for performing a land leveling preparation so as to maximize the distance between the centers of the crawlers before conveying a working vehicle there. When the above preparation cannot be performed, the crane operation has to be performed with the minimum distance between the centers of the crawlers.

However, when the land leveling preparation is performed, the start of crane operation of the crawler vehicle is delayed. Further, with a crawler vehicle incapable of performing the land leveling operation by itself such as the crawler crane, there is a need for introducing other working vehicle for land leveling separately from the crawler vehicle. Thereby, working cost is increased. When the work is performed with the minimum distance between the centers of the crawlers, it is not possible to exhibit a sufficient performance of the crawler vehicle.

SUMMARY OF THE INVENTION

It is an object of the present invention to provide a crawler vehicle capable of suppressing a land leveling preparation as less as possible so as to improve efficiency of a work at the time of working at a place where a ground space of crawlers is limited. It is another object of the present invention is to provide a crawler vehicle with a high work performance.

The crawler vehicle according to the present invention comprises a track frame, a pair of left and right crawler frames provided on the both left and right sides of the track frame, a pair of left and right crawlers installed in outer peripheries of the crawler frames. A pair of the left and right crawler frames are positioned and fixed to the track frame by a positioning device. The positioning device can position and fix the crawler frames at least at three positions including an expansion position for maximizing a distance between centers of the crawlers, a contraction position for minimizing the distance, and an intermediate position in the middle of both the above positions.

Therefore, it is possible to position and fix at the intermediate position in addition to the expansion position and the contraction position. Consequently, a working vehicle is stably set at a narrower place than a grounding space of the crawlers required in the case where the distance between the centers of the crawlers is maximized. It is possible to suppress a work for leveling a working place. Further, at the intermediate position, since the distance between the centers of the crawlers is widened more than the case where the distance between the centers of the crawlers is minimized, a performance of the working vehicle is improved.

A description will be given to major preferred aspects according to the present invention below. As a device for positioning the crawler frames, a connection link with one end thereof connected to the crawler frame, and a fixing bracket attached to the track frame are preferably used. The fixing bracket may be provided with a fixing member hole into which a fixing member is insertable, and a positioning member hole into which a positioning member is insertable. Meanwhile, the connection link is provided with three fixing member holes corresponding to the fixing member hole of the fixing bracket when the crawler frames are positioned at the expansion position, the contraction position or the intermediate position. As the positioning member, a pin or a bolt may be used.

In the above preferred aspect, when the crawler frames are positioned at the expansion position, the contraction position or the intermediate position, one of the three fixing member holes provided in the connection link corresponds to the fixing member hole of the fixing bracket. By inserting the fixing member into both the fixing member holes, the crawler frames are fixed at any of the above three positions.

Further, a positioning protruding portion brought into contact with the positioning member inserted into the positioning member hole of the fixing bracket for performing positioning when the crawler frames are moved from the expansion position or the contraction position to the intermediate position may be preferably provided. Preferably, the positioning member hole includes a first positioning pin hole and a second positioning pin hole arranged in line along the moving direction of the connection link, and the crawler frames are brought into contact with any of the first positioning pin hole and the second positioning pin hole and positioned when the crawler frames are moved from the expansion position or the contraction position to the intermediate position.

In the above preferred aspect, when the crawler frames are moved from the expansion position or the contraction position to the intermediate position, by preliminarily inserting the positioning member into the positioning member hole of the fixing bracket, the positioning member is brought into contact with the positioning protruding portion of the connection link so that the crawler frames are positioned at the intermediate position.

Further, a guide portion is preferably provided in the fixing bracket so as to guide the connection link when the crawler frames are moved between the expansion position and the contraction position. According to the above preferred aspect, when the crawler frames are moved between the expansion position and the contraction position, the connection link is displaced relative to the fixing bracket in the axial direction. However, since the connection link is guided by the guide portion provided in the fixing bracket, the relative displacement is smoothly performed.

BRIEF DESCRIPTION OF THE DRAWINGS

FIG. 2 is an enlarged view of the vicinity of a positioning device for fixing a crawler frame on the right side shown in FIG. 1 to an axle on the rear right side of a track frame;

FIG. 3 is a sectional view by line X-X of FIG. 2;

DETAILED DESCRIPTION OF THE PREFERRED EMBODIMENTS

Hereinafter, a description will be given to an embodiment which is the best mode for carrying out the present invention with reference to the drawings.

Figure 1:
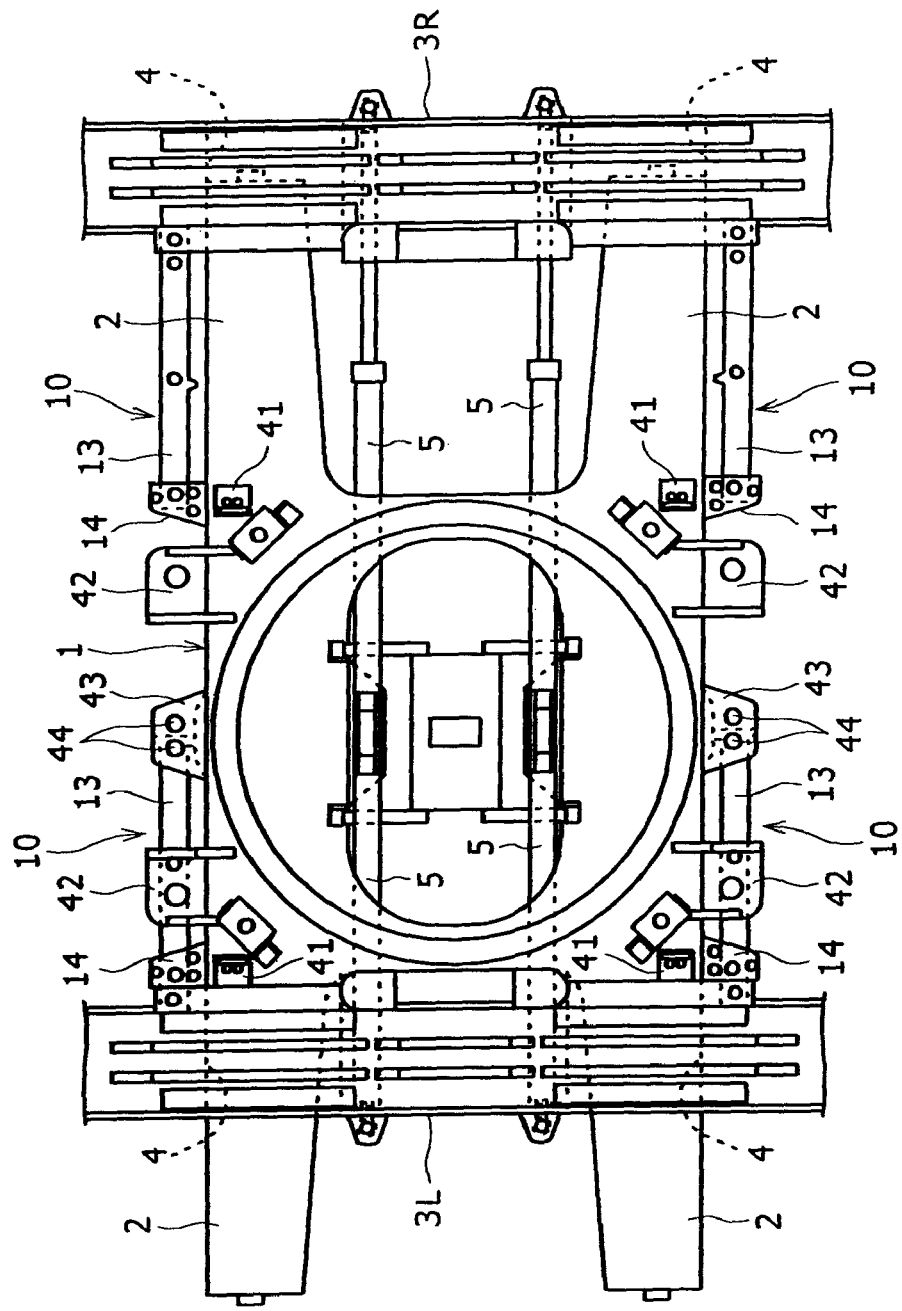
FIG. 1 is a plan view showing a frame structure of a lower traveling body of a crawler vehicle according to an embodiment of the present invention.

FIG. 1 shows a frame structure of a lower traveling body of a crawler vehicle according to an embodiment of the present invention. In FIG. 1, the reference numeral 1 denotes a track frame for supporting an upper rotating body. The track frame 1 is also called as a car body. The track frame 1 has a total of four axles 2 including pairs of left and right axles at two points on the front and rear sides extending from a central part to the outside in the vehicle width direction. The axles 2 have a rectangular closed cross section structure. Base ends of a pair of the left and right axles 2 on the front side or the rear side are connected to each other.

The reference numerals 3L and 3R denote a pair of left and right crawler frames provided on the both left and right sides of the track frame 1. In outer peripheries of the crawler frames 3L and 3R, although not shown, crawlers are installed through drive sprockets or idler wheels. In correspondence with the two axles 2 on the front and rear sides of the track frame 1, the crawler frames 3L and 3R are provided with through holes 4 in a rectangular shape passing through in the vehicle width direction (the lateral direction) at two points on the front and rear sides. The crawler frames 3L and 3R are attached on the both left and right sides of the track frame 1 in a state that the two axles 2 on the front and rear sides of the track frame 1 are inserted through both the through holes 4.

Between the central part of the track frame 1 and the crawler frames 3L and 3R, a total of four expanding and contracting hydraulic cylinders 5 including two pairs of hydraulic cylinders on the front and rear sides extending in the vehicle width direction. By the hydraulic cylinders 5, the crawler frames 3L and 3R can be moved between an expansion position for maximizing a distance between centers of the crawlers and a contraction position for minimizing the distance along the axles 2 of the track frame 1. FIG. 1 shows a state that the crawler frame 3L on the left side is positioned at the contraction position, and a state that the crawler frame 3R on the right side is positioned at the expansion position. When the crawler frames 3L and 3R are positioned at the expansion position or the contraction position, the crawler frames 3L and 3R are fixed to the track frame 1 through two positioning devices 10 on the front and rear sides provided in correspondence with the two axles 2 on the front and rear sides.

The positioning devices 10 fix the crawler frames 3L and 3R to the track frame 1 at the expansion position and the contraction position. The positioning devices 10 position and fix the crawler frames 3L and 3R to the track frame 1 at an intermediate position in the middle of both the above positions. Hereinafter, taking the case where the crawler frame 3R on the right side is fixed to the axle 2 on the rear right side of the track frame 1 as an example, the positioning device 10 will be explained.

The positioning device 10 is, as enlarged and shown in detail in FIGS. 2 and 3, arranged along a rear side surface of the axle 2 of the track frame 1 in the vehicle width direction. The positioning device 10 is provided with a connection link 13 with one end thereof connected to an attachment portion 11 provided on an inner side surface of the crawler frame 3R through a connection pin 12, and in correspondence with the connection link 13, a fixing bracket 14 attached to a rear side surface on the base end side of the axle 2 of the track frame 1.

Figure 4A:
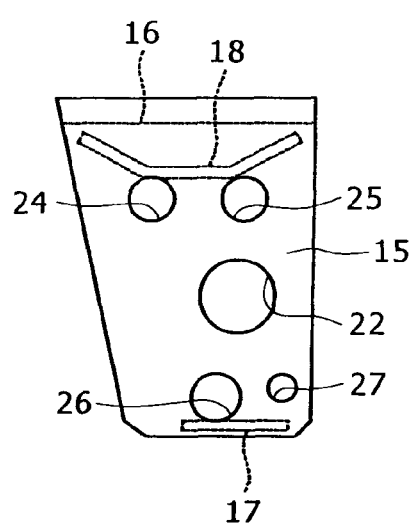
FIG. 4A is a plan view of a fixing bracket.
Figure 4B:
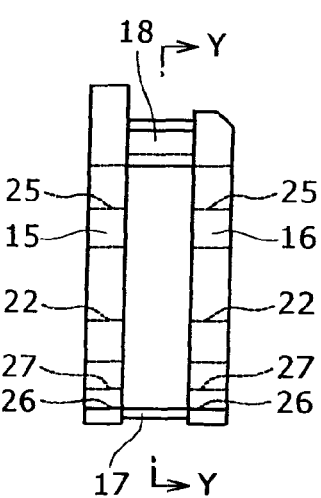
FIG. 4B is a right side view of the fixing bracket.
Figure 5:
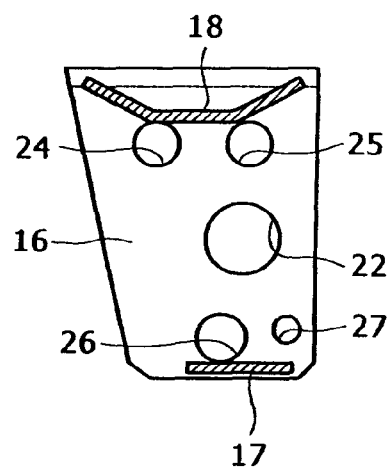
FIG. 5 is a sectional view by line Y-Y of FIG. 4B.

The fixing bracket 14 has, as shown in FIGS. 4 and 5, an upper surface plate 15 in a trapezoid shape and a lower surface plate 16 in a trapezoid shape which is the same as the upper surface plate 15. A base end of the lower surface plate 16 to be attached to the axle 2 is shorter than a base end of the upper surface plate 15. Between a front end part of the upper surface plate 15 and a front end part of the lower surface plate 16, a front end guide plate 17 is fixedly mounted. Between a base end part of the upper surface plate 15 and a base end part of the lower surface plate 16, a base end guide plate 18 is fixedly mounted. By such a configuration, the fixing bracket 14 retains the connection link 13 movably in the vehicle width direction. As shown in FIGS. 4 and 5, the upper surface plate 15 and the lower surface plate 16 are provided with fixing pin holes 22 into which a fixing pin 21 is inserted so as to pass through central portions thereof in the up and down direction. The upper surface plate 15 and the lower surface plate 16 are provided with first positioning pin holes 24 and second positioning pin holes 25 into which a positioning pin 23 is inserted so as to pass through the vicinity of the outside of the base end guide plate 18 in the up and down direction. Further, the upper surface plate 15 and the lower surface plate 16 are also provided with third positioning pin holes 26 into which the positioning pin 23 is inserted so as to pass through the vicinity of the inside of the front end guide plate 17 in the up and down direction, and guide pin holes 27 into which a guide pin (not shown) is inserted so as to pass through the inside of the front end guide plate 17 in the up and down direction in parallel to the third positioning pin holes 26.

Figure 6:
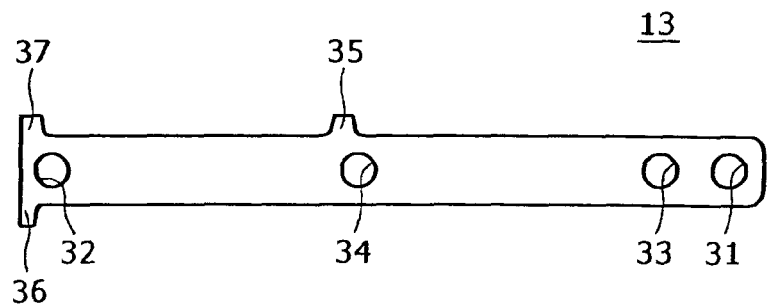
FIG. 6 is a plan view of a connection link.

Meanwhile, the connection link 13 is, as shown in FIG. 6, formed in a rod shape with a rectangular section. As shown in FIGS. 2 and 3, one end part of the connection link 13 is provided with a connection pin hole 31 into which the connection pin 12 for connecting to the attachment portion 11 of the crawler frame 3R is insertable. The connection link 13 is provided with a first fixing pin hole 32, a second fixing pin hole 33 and a third fixing pin hole 34 as fixing member holes of the connecting link 13 corresponding to the fixing pin hole 22 as the fixing member hole of the fixing bracket 14 when the crawler frame 3R is positioned at the expansion position, the contraction position or the intermediate position. In a side surface closer to the axle 2 of a central part of the connection link 13, a positioning (intermediate) protruding portion 35 brought into contact with the positioning pin 23 inserted into the first positioning pin hole 24 or the second positioning pin hole 25 of the fixing bracket 14 for performing positioning when the crawler frame 3R is moved from the expansion position or the contraction position to the intermediate position is protrudingly provided. The other end part of the connection link 13 is provided with a first protruding portion 36 and a second protruding portion 37 protruding towards the sides from both the side surfaces thereof. The first protruding portion 36 is brought into contact with the positioning pin 23 inserted into the third positioning pin hole 26 of the fixing bracket 14 for performing positioning when the crawler frame 3R is moved from the contraction position or the intermediate position to the expansion position.

It should be noted that in FIGS. 1 and 2, the reference numeral 41 denotes a contraction-position stopper attached to an upper surface of the base end part of the axle 2 of the track frame 1. The contraction-position stopper 41 is brought into contact with the crawler frames 3L and 3R for performing positioning when the crawler frames 3L and 3R are moved to the contraction position. The reference numeral 42 denotes an attachment bracket for translifter, the attachment protrudingly attached on the front side or the rear side of the upper surface of the base end part of the axle 2 of the track frame 1, and there are four attachment brackets for translifter 42. The reference numeral 43 denotes a supporting bracket attached to the lower surface side of the central part of the track frame 1. The supporting bracket 43 is provided with a pair of left and right fixing pin holes 44 corresponding to the first fixing pin holes 32 of the connection link 13 of a pair of the left and right positioning devices 10 when the crawler frames 3L and 3R are moved to the contraction position.

Next, a description will be given to an operation procedure at the time of positioning and fixing the crawler frame 3R to the track frame 1 by using the positioning device 10 for each of separated cases where the crawler frame 3R is moved between three positions including the expansion position, the contraction position and the intermediate position.

Figure 7:
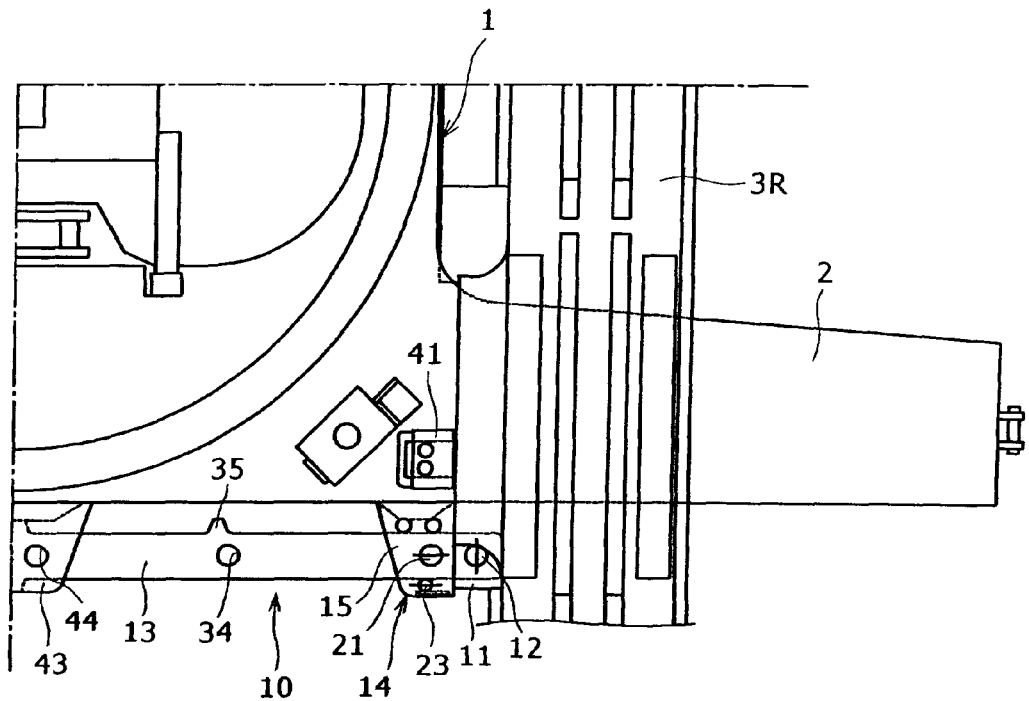
FIG. 7 is a view corresponding to FIG. 2 showing a state that the crawler frame is positioned at a contraction position.

(1) In the Case where the Crawler Frame 3R is Moved from the Expansion Position to the Contraction Position As shown in FIG. 2, the crawler frame 3R is positioned at the expansion position. In such a state, in the positioning device 10, the first fixing pin hole 32 of the connection link 13 and the fixing pin hole 22 of the fixing bracket 14 are in a line. The fixing pin 21 is inserted into both the pin holes 32 and 22 so that the crawler frame 3R is fixed to the expansion position. From such a state, the fixing pin 21 is removed and, as shown in FIG. 2, the positioning pin 23 is inserted into the third positioning pin hole 26 of the fixing bracket 14. Then, the crawler frame 3R is moved from the expansion position to the contraction position by a contraction action of the expanding and contracting hydraulic cylinder 5. As shown in FIG. 7, the crawler frame 3R is brought into contact with the contraction-position stopper 41 and positioned. The second fixing pin hole 33 of the connection link 13 and the fixing pin hole 22 of the fixing bracket 14 are in a line. The fixing pin 21 is inserted into both the pin holes 33 and 22 so that the crawler frame 3R is fixed to the contraction position. The positioning pin 23 remains inserted into the third positioning pin hole 26 of the fixing bracket 14.

(2) In the Case where the Crawler Frame 3R is Moved from the Contraction Position to the Expansion Position After the fixing pin 21 is removed from a state that the crawler frame 3R is fixed to the contraction position, the crawler frame 3R is moved from the contraction position to the expansion position by an expansion action of the expanding and contracting hydraulic cylinder 5. As shown in FIG. 2, the positioning pin 23 inserted into the third positioning pin hole 26 of the fixing bracket 14 is brought into contact with the first protruding portion 36 of the connection link 13 so that the crawler frame 3R is positioned. In such a state, the first fixing pin hole 32 of the connection link 13 and the fixing pin hole 22 of the fixing bracket 14 are in a line. The fixing pin 21 is inserted into both the pin holes 32 and 22 so that the crawler frame 3R is fixed to the expansion position. When the positioning pin 23 remains inserted into the third positioning pin hole 26 of the fixing bracket 14, a load is imposed on the positioning pin 23 at the time of work at the expansion position. Therefore, the positioning pin 23 is moved into the second positioning pin hole 25 of the fixing bracket 14 and it is held there.

Figure 8:
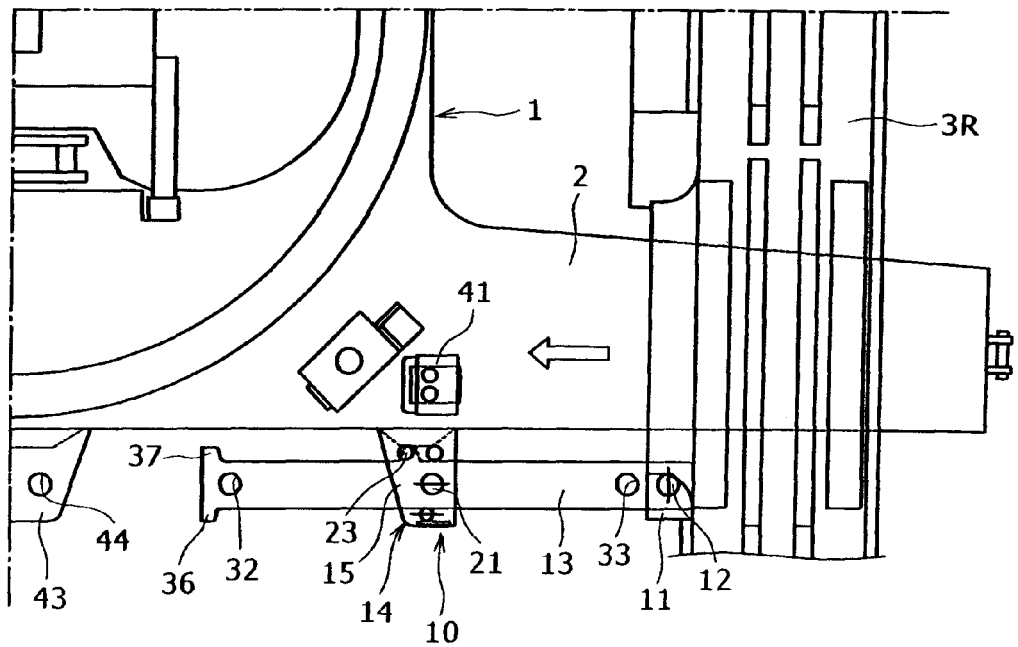
FIG. 8 is a view corresponding to FIG. 2 showing a state that the crawler frame is moved from an expansion position to an intermediate position.

(3) In the Case where the Crawler Frame 3R is Moved from the Expansion Position to the Intermediate Position After the fixing pin 21 is removed from a state that the crawler frame 3R is fixed to the expansion position and the positioning pin 23 is moved from the second positioning pin hole 25 of the fixing bracket 14 into the first positioning pin hole 24, the crawler frame 3R is moved from the expansion position to the intermediate position by the contraction action of the expanding and contracting hydraulic cylinder 5. As shown in FIG. 8, the positioning pin 23 inserted into the first positioning pin hole 24 of the fixing bracket 14 is brought into contact with the positioning protruding portion 35 of the connection link 13 so that the crawler frame 3R is positioned. In such a state, the third fixing pin hole 34 of the connection link 13 and the fixing pin hole 22 of the fixing bracket 14 are in a line. The fixing pin 21 is inserted into both the pin holes 34 and 22 so that the crawler frame 3R is fixed to the intermediate position. Then, the positioning pin 23 is moved into the third positioning pin hole 26 of the fixing bracket 14 so that the positioning pin 23 is held there.

(4) In the Case where the Crawler Frame 3R is Moved from the Intermediate Position to the Expansion Position After the fixing pin 21 is removed from a state that the crawler frame 3R is fixed to the intermediate position, the crawler frame 3R is moved from the intermediate position to the expansion position by the expansion action of the expanding and contracting hydraulic cylinder 5. Therefore, the positioning pin 23 inserted into the third positioning pin hole 26 of the fixing bracket 14 is brought into contact with the first protruding portion 36 of the connection link 13 so that the crawler frame 3R is positioned. In such a state, the first fixing pin hole 32 of the connection link 13 and the fixing pin hole 22 of the fixing bracket 14 are in a line. The fixing pin 21 is inserted into both the pin holes 32 and 22 so that the crawler frame 3R is fixed to the expansion position. Then, the positioning pin 23 is moved into the second positioning pin hole 25 of the fixing bracket 14 so that the positioning pin 23 is held there.

(5) In the Case where the Crawler Frame 3R is Moved from the Intermediate Position to the Contraction Position After the fixing pin 21 is removed from a state that the crawler frame 3R is fixed to the intermediate position, the crawler frame 3R is moved to the contraction position by the contraction action of the expanding and contracting hydraulic cylinder 5. Therefore, the crawler frame 3R is brought into contact with the contraction-position stopper 41 so that the crawler frame 3R is positioned. In such a state, the second fixing pin hole 33 of the connection link 13 and the fixing pin hole 22 of the fixing bracket 14 are in a line. The fixing pin 21 is inserted into both the pin holes 33 and 22 so that the crawler frame 3R is fixed to the contraction position. The positioning pin 23 remains inserted into the third positioning pin hole 26 of the fixing bracket 14 and it is held there.

Figure 9:
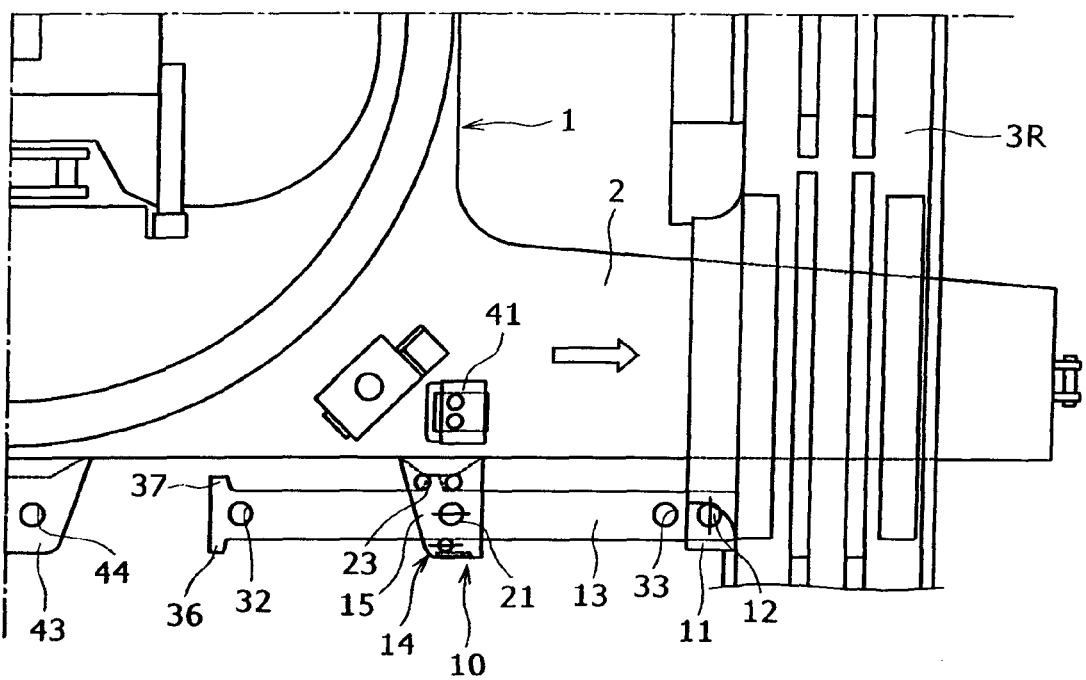
FIG. 9 is a view corresponding to FIG. 2 showing a state that the crawler frame is moved from the contraction position to the intermediate position.

(6) In the Case where the Crawler Frame 3R is Moved from the Contraction Position to the Intermediate Position After the fixing pin 21 is removed from a state that the crawler frame 3R is fixed to the contraction position and the positioning pin 23 is moved from the third positioning pin hole 26 of the fixing bracket 14 into the second positioning pin hole 25, the crawler frame 3R is moved from the contraction position to the intermediate position by the expansion action of the expanding and contracting hydraulic cylinder 5. As shown in FIG. 9, the positioning pin 23 inserted into the second positioning pin hole 25 of the fixing bracket 14 is brought into contact with the positioning protruding portion 35 of the connection link 13 so that the crawler frame 3R is positioned. In such a state, the third fixing pin hole 34 of the connection link 13 and the fixing pin hole 22 of the fixing bracket 14 are in a line. The fixing pin 21 is inserted into both the pin holes 34 and 22 so that the crawler frame 3R is fixed to the intermediate position. Then, the positioning pin 23 is moved into the third positioning pin hole 26 of the fixing bracket 14 so that the positioning pin 23 is held there.

Figure 10:
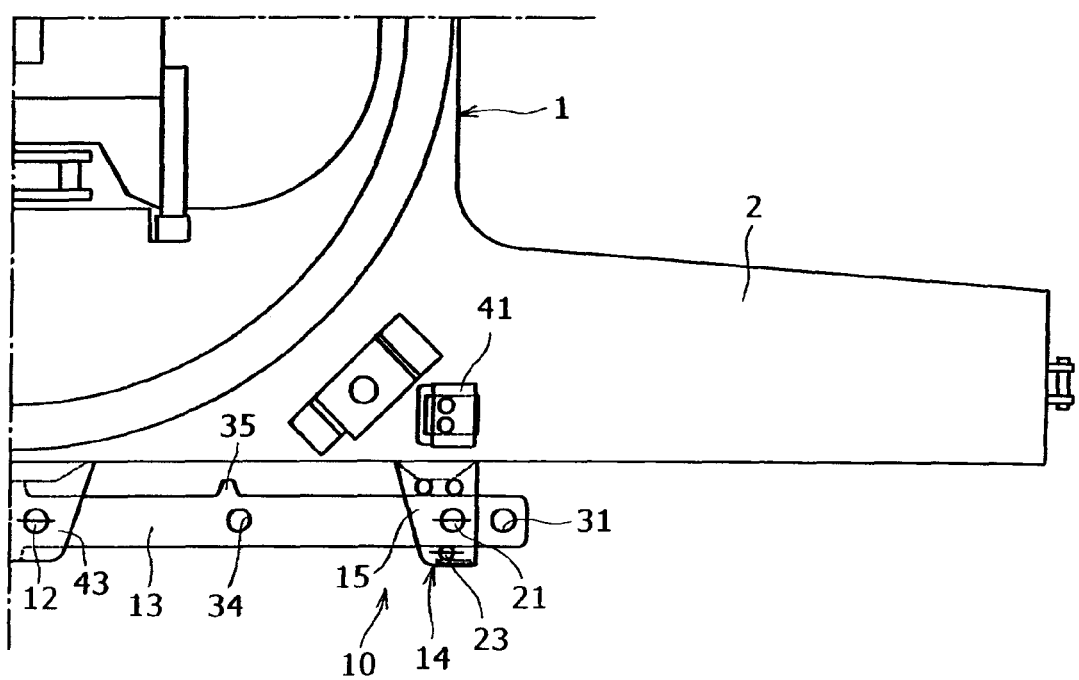
FIG. 10 is a view corresponding to FIG. 2 showing a state that the crawler frame is removed from the axle of the track frame.

(7) In the Case where the Crawler Frame 3R is Removed from the Contraction Position for Decomposing and Conveying the Crawler Frame 3R When the crawler frame 3R is positioned at the contraction position, as shown in FIG. 7, the second fixing pin hole 33 of the connection link 13 of the positioning device 10 corresponds to the fixing pin hole 22 of the fixing bracket 14. The fixing pin 21 is inserted into both the pin holes 33 and 22. The first fixing pin hole 32 and the fixing pin hole 44 of the supporting bracket 43 are in a line. Firstly, from such a state, the connection pin 12 for connecting one end of the connection link 13 to the attachment portion 11 of the crawler frame 3R is removed, and the connection pin 12 is inserted into the first fixing pin hole 32 of the connection link 13 and the fixing pin hole 44 of the supporting bracket 43 so that the connection link 13 is fixed to the supporting bracket 43. Next, as shown in FIG. 10, after the crawler frame 3R is moved to the expansion position by the expansion action of the expanding and contracting hydraulic cylinder 5, the crawler frame 3R is removed from a front end of the axle 2 of the track frame 1.

In the above embodiment, four positioning devices 10 for positioning and fixing the crawler frames 3L and 3R to the track frame 1 exhibit positioning and fixing functions at the expansion position for maximizing the distance between the centers of the crawlers, the contraction position for minimizing the distance, and the intermediate position in the middle of both the above positions. Therefore, at a working place such as a mountain area where a grounding space of the crawlers is limited, it is possible to improve efficiency of the crane operation. That is, by positioning and fixing the crawler frames 3L and 3R at the intermediate position of the track frame 1, it is possible to stably arrange a crawler vehicle at a place where the grounding space of the crawlers is narrower than the space required in the case where the distance between the centers of the crawlers is maximized. Therefore, it is possible to suppress an operation for leveling a working place. Since the distance between the centers of the crawlers is widened more than the case where the distance between the centers of the crawlers is minimized, it is possible to improve a performance of the crawler vehicle.

Moreover, the positioning device 10 has a simple structure only having one connection link 13 and one fixing bracket 14. Therefore, it is possible to surely exhibit the fixing function when the corresponding crawler frames 3L and 3R are positioned at the expansion position, the contraction position or the intermediate position, and the positioning function when the crawler frames 3L and 3R are moved from the expansion position or the contraction position to the intermediate position and when the crawler frames 3L and 3R are moved from the contraction position or the intermediate position to the expansion position. Consequently, there is no need for ensuring a large ground space, and it is possible to reduce the number of parts, and hence it is highly advantageous at the time of realization.

Further, when the crawler frames 3L and 3R are moved between the expansion position and the contraction position, the connection link 13 of the positioning device 10 and the fixing bracket 14 are relatively moved along the axial direction. At the time of the relative movement, since the connection link 13 is supported by the fixing bracket 14, the connection link 13 is not dropped off. Further, the connection link 13 is guided by the guide pin serving as a guide means inserted into the guide pin hole 27 of the fixing bracket 14 so that the relative movement can be smoothly performed. According to the above, a handling performance and reliability of the positioning device 10 are improved.

It should be noted that the present invention is not limited to the above embodiment but includes a variety of other modes. For example, in the above embodiment, for the positioning when the crawler frames 3L and 3R are moved from the expansion position or the intermediate position to the contraction position, the contraction-position stopper 41 is attached to the upper surface of the base end part of the axle 2 of the track frame 1. In the present invention, instead of the contraction-position stopper 41, the fixing bracket 14 may be brought into contact with the attachment portion 11 or the like of the crawler frames 3L and 3R so that the crawler frames 3L and 3R are positioned at the contraction position.

In the above embodiment, as the guide means for guiding the connection link 13, the guide pin detachable from the guide pin hole 27 provided in the fixing bracket 14 is used. However, the present invention is not limited to the above, and the guide means may be fixed to the fixing bracket or formed as one part together with the fixing bracket.

Further, in the above embodiment, the through holes 4 passing through in the vehicle width direction are provided in a pair of the left and right crawler frames 3L and 3R in correspondence with the axles 2 of the track frame 1, and the axles 2 of the track frame 1 pass through the through holes 4 so that the crawler frames 3L and 3R can be moved between the expansion position for maximizing the distance between the centers of the crawlers and the contraction position for minimizing the distance. However, the present invention is not limited to such a structure but can be similarly applied to, for example, a crawler vehicle in which crawler frames can be moved between an expansion position and a contraction position with an expanding and contracting structure of axles of a track frame.

Further, the above embodiment shows an example that there is one intermediate position and the positioning is performed at a total of three positions. However, in the present invention, two or more intermediate positions may be provided.

Although the invention has been described with reference to the preferred embodiments in the attached figures, it is noted that equivalents may be employed and substitutions made herein without departing from the scope of the invention as recited in the claims.

I claim:

1. A crawler vehicle, comprising:
a track frame;
left and right crawler frames provided on the both left and right sides of said track frame;
left and right crawlers installed in outer peripheries of said crawler frames relatively; and
a positioning device for positioning and fixing each of said left and right crawler frames to said track frame, the respective positioning device for each of said left and right crawler frames positioning and fixing at least at three positions including an expansion position for maximizing a distance between centers of said crawlers, a contraction position for minimizing the distance, and an intermediate position in the middle of both the above positions,
wherein each of said positioning devices comprises:
a connection link having one end connected to one of said crawler frames and provided with an intermediate protruding portion and with at least three fixing member holes;
a fixing bracket attached to said track frame and provided with a fixing member hole into which a fixing member is insertable, and at least one positioning member hole; and
a positioning member removably positioned in the at least one positioning member hole,
wherein the intermediate protruding portion of the connecting link and the at least one positioning member hole of the fixing bracket are arranged such that the intermediate protruding portion is brought into contact with the positioning member inserted into the at least one positioning member hole for performing positioning of the one of the crawler frames at the intermediate position when said connection link is moved during movement of said one of the crawler frames from the expansion position or the contraction position to the intermediate position.

2. The crawler vehicle according to claim 1, wherein said fixing member holes of said connection link and said fixing member hole of said fixing bracket are in a line when said crawler frames are positioned at the expansion position, the contraction position or the intermediate position.

3. The crawler vehicle according to claim 1, wherein said positioning member is a positioning pin, and said at least one positioning member hole of said fixing bracket comprises a first positioning pin hole and a second positioning pin hole arranged in a line with the first positioning pin hole along the moving direction of said connection link.

4. The crawler vehicle according to claim 3, wherein said connecting link is also provided with a first protruding portion, and wherein said fixing bracket is provided with a third positioning pin hole, wherein the first protruding portion of the connecting link and the third positioning pin hole of the fixing bracket are arranged such that the first protruding portion is brought into contact with the positioning pin inserted into the third positioning pin hole for performing positioning of the one of the crawler frames at the expansion position when said one of the crawler frames is moved to the expansion position.

5. The crawler vehicle according to claim 1, further comprising:
a guide means provided in said fixing bracket so as to guide said connection link when said crawler frames are moved between the expansion position and the contraction position.

* * * * *